(12) United States Patent
Fukawatase et al.

(10) Patent No.: US 10,000,178 B2
(45) Date of Patent: Jun. 19, 2018

(54) VEHICLE CURTAIN AIRBAG DEVICE

(71) Applicant: TOYOTA JIDOSHA KABUSHIKI KAISHA, Toyota-shi, Aichi-ken (JP)

(72) Inventors: Osamu Fukawatase, Miyoshi (JP); Atsushi Nakashima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 14/807,121

(22) Filed: Jul. 23, 2015

(65) Prior Publication Data

US 2016/0039384 A1 Feb. 11, 2016

(30) Foreign Application Priority Data

Aug. 8, 2014 (JP) .................................. 2014-163014

(51) Int. Cl.
*B60R 21/232* (2011.01)
*B60R 21/231* (2011.01)
*B60R 21/233* (2006.01)
*B60R 21/2346* (2011.01)
*B60R 21/16* (2006.01)

(52) U.S. Cl.
CPC .......... *B60R 21/232* (2013.01); *B60R 21/233* (2013.01); *B60R 21/2346* (2013.01); *B60R 21/23138* (2013.01); *B60R 21/16* (2013.01); *B60R 2021/23316* (2013.01)

(58) Field of Classification Search
CPC . B60R 21/232; B60R 21/2346; B60R 21/233; B60R 21/23138; B60R 21/16; B60R 2021/23316

USPC .......................................................... 280/729

See application file for complete search history.

(56) References Cited

U.S. PATENT DOCUMENTS

| | | | | |
|---|---|---|---|---|
| 6,932,386 B2* | 8/2005 | Ikeda | ..................... | B60R 21/232 280/730.2 |
| 8,033,568 B2* | 10/2011 | Tanaka | .................. | B60R 21/232 280/729 |
| 9,211,863 B2* | 12/2015 | Kashio | .................. | B60R 21/232 |
| 9,744,935 B2* | 8/2017 | Ohno | ..................... | B60R 21/232 |
| 9,862,349 B2* | 1/2018 | Fujiwara | ............... | B60R 21/237 |
| 2005/0116451 A1 | 6/2005 | Kino et al. | | |
| 2010/0032930 A1 | 2/2010 | Yamamura et al. | | |
| 2012/0098240 A1* | 4/2012 | Kato | ..................... | B60R 21/232 280/730.2 |
| 2012/0200069 A1 | 8/2012 | Kato et al. | | |

(Continued)

FOREIGN PATENT DOCUMENTS

| | | |
|---|---|---|
| DE | 602004000807 T2 | 10/2006 |
| DE | 102009053381 A1 | 5/2011 |

(Continued)

*Primary Examiner* — Karen Beck
(74) *Attorney, Agent, or Firm* — Oliff PLC (57) ABSTRACT

A vehicle curtain airbag device that includes: front and rear main chambers that receive gas supplied from an inflator, and that inflate and deploy between respective positions of heads of a front seat occupant and a rear seat occupant, and a side section of a vehicle body; and a delay chamber that is provided spanning between the front and rear main chambers, and that is only supplied with gas through a gas supply opening formed at a boundary between the delay chamber and the main chamber on a front side.

15 Claims, 8 Drawing Sheets

(56) References Cited

U.S. PATENT DOCUMENTS

| | | | |
|---|---|---|---|
| 2012/0217216 A1* | 8/2012 | Owens | B60P 1/5423 |
| | | | 212/277 |
| 2016/0031404 A1* | 2/2016 | Takedomi | B60R 21/2334 |
| | | | 280/729 |
| 2018/0073216 A1* | 3/2018 | Holt | E02F 3/8816 |

FOREIGN PATENT DOCUMENTS

| | | | |
|---|---|---|---|
| JP | 2008-006895 A | | 1/2008 |
| JP | 2011-240884 A | | 12/2011 |
| JP | 2012-091650 A | | 5/2012 |
| JP | 2012-162185 A | | 8/2012 |
| JP | 2017001658 A | * | 1/2017 |

* cited by examiner

VEHICLE CURTAIN AIRBAG DEVICE

CROSS-REFERENCE TO RELATED APPLICATION

This application is based on and claims priority under 35 USC 119 from Japanese Patent Application No. 2014-163014 filed on Aug. 8, 2014, which is incorporated by reference herein.

BACKGROUND

Technical Field

The present invention relates to a vehicle curtain airbag device.

Related Art

A curtain airbag device described in Japanese Patent Application Laid-Open (JP-A) No. 2011-240884 includes front and rear main chambers (first chambers) that deploy first and mainly protect the respective heads of a front seat occupant and a rear seat occupant, and a delay chamber that is provided between, and inflates and deploys later than, the front and rear main chambers.

When a tall vehicle such as a sports utility vehicle or the like (referred to hereafter as an SUV or the like) collides with the side of a low vehicle, sometimes the bumper of the SUV or the like overlaps in the height direction with the head of an occupant in the lower vehicle. Improved occupant head protection performance is demanded of curtain airbags in such cases. In particular, improved front seat occupant head protection performance is demanded in cases in which when the SUV or the like collides at high speed.

In consideration of the above circumstances, an object of the present invention is to obtain a vehicle curtain airbag device contributing to improved front seat occupant head protection performance in a side collision.

SUMMARY

A vehicle curtain airbag device of a first aspect includes: front and rear main chambers that receive gas supplied from an inflator, and that inflate and deploy between respective positions of the heads of a front seat occupant and a rear seat occupant, and a side section of a vehicle body; and a delay chamber that is provided spanning between the front and rear main chambers, and that is only supplied with gas through a gas supply opening formed at a boundary between the delay chamber and the main chamber on the front side.

In the first aspect, the inflator is actuated when, for example, a side collision is predicted or detected. When this is performed, gas from the inflator is supplied to the front and rear main chambers, and the front and rear main chambers inflate and deploy between the respective heads of an occupant in the front seat and an occupant in the rear seat and the side section of the vehicle body, and the front and rear main chambers restrain the heads of the respective occupants. Note that in a side collision with a high collision speed, there are particular demands to suppress an excessive rise in internal pressure in the main chamber on the front side that restrains the head of the front seat occupant, and to suppress an increase in the load applied to the head of the front seat occupant.

Regarding this point, in the present invention, the delay chamber that is only supplied with gas through the gas supply opening formed at the boundary with the main chamber on the front side is provided spanning between the front and rear main chambers. The delay chamber is provided over a broad range spanning between the front and rear main chambers, and can accordingly be set with a large capacity. Moreover, gas is only supplied to the large capacity delay chamber from the main chamber on the front side. Accordingly, some of the gas supplied to the main chamber on the front side can escape efficiently to the delay chamber when the main chamber on the front side is pressed by the head of the front seat occupant in a side collision with a high collision speed. An excessive rise in the internal pressure of the main chamber on the front side can accordingly be suppressed as a result, thereby enabling an increase in the load applied to the head of the front seat occupant to be suppressed. Due to the above, a contribution is made to improving the front seat occupant head protection performance in a side collision.

A vehicle curtain airbag device of a second aspect is the first aspect, wherein at least a portion of the gas supply opening is positioned further to a vehicle front side than a B pillar of the vehicle as viewed along a vehicle width direction in the inflated and deployed state.

In the second aspect, due to the above configuration, squeezing and blockage of the entire gas supply opening by the B pillar, and large reduction of the gas supply opening of the delay chamber, can be avoided even when there is heavy ingress of the B pillar to the inside of a vehicle cabin in a high speed side collision with an SUV or the like in the vicinity of the B pillar. This thereby enables gas to escape from the main chamber on the front side to the delay chamber in a stable manner.

A vehicle curtain airbag device of a third aspect includes: front and rear main chambers that receive gas supplied from an inflator and that inflate and deploy between respective positions of the heads of a front seat occupant and a rear seat occupant, and a side section of a vehicle body; and a delay chamber that is provided spanning between the front and rear main chambers, that is supplied with gas through a gas supply opening formed at a boundary between the delay chamber and the main chamber on the front side, wherein at least a portion of the gas supply opening is positioned further to a vehicle front side than a B pillar of the vehicle as viewed along a vehicle width direction in an inflated and deployed state of the front and rear main chambers.

In the third aspect, the inflator is actuated when, for example, a side collision is predicted or detected. When this is performed, gas from the inflator is supplied to the front and rear main chambers, and the front and rear main chambers inflate and deploy between the respective heads of the front seat occupant and the rear seat occupant and the side section of the vehicle body, and the front and rear main chambers restrain the heads of the respective occupants. Note that in a side collision with a high collision speed, there are particular demands to suppress an excessive rise in the internal pressure in the main chamber on the front side that restrains the head of the front seat occupant, and to suppress an increase in the load applied to the head of the front seat occupant.

Regarding this point, in the present invention, the delay chamber that is supplied with gas through the gas supply opening formed to the boundary with the main chamber on the front side is provided spanning between the front and rear main chambers. Moreover, at least a portion of the gas supply opening of the delay chamber is set at a position further to the vehicle front side than the B pillar of the vehicle as viewed along the vehicle width direction in the inflated and deployed state of the front and rear main chambers. Accordingly, squeezing and blockage of the entire gas supply opening of the delay chamber by the B pillar, and large reduction of the gas supply opening, can be avoided even when there is heavy ingress of the B pillar to the inside of a vehicle cabin. This thereby enables gas to escape from the main chamber on the front side to the delay chamber in a stable manner. An excessive rise in internal pressure of the main chamber on the front side can accordingly be suppressed as a result, thereby enabling an increase in the load applied to the head of the front seat occupant to be suppressed. Due to the above, a contribution is made to improving the front seat occupant head protection performance in a side collision.

A vehicle curtain airbag device of a fourth aspect is the second aspect or the third aspect, wherein there is a single one of the gas supply openings provided, and in the inflated and deployed state, the entire gas supply opening is positioned further to the vehicle front side than the B pillar as viewed along a vehicle width direction.

In the fourth aspect, a single one of the gas supply openings formed to the boundary between the main chamber on the front side and the delay chamber is provided, thereby enabling the cross-section area of the gas supply opening to be set larger than in cases in which plural gas supply openings are formed to the boundary. Moreover, in the inflated and deployed state of the front and rear main chambers, the entirety of the single gas supply opening is positioned further to the vehicle front side than the B pillar as viewed along the vehicle width direction, such that the advantageous effect of enabling stable gas escape from the main chamber on the front side to the delay chamber can be well-secured.

A vehicle curtain airbag device of a fifth aspect is either the second aspect or the third aspect, wherein the gas supply opening is configured by an upper side gas supply opening provided to an upper portion side of the boundary, and a lower side gas supply opening provided to a lower portion side of the boundary; and as viewed along the vehicle width direction in the inflated and deployed state, the upper side gas supply opening overlaps with the B pillar, and the lower side gas supply opening is positioned further to the vehicle front side than the B pillar.

In the fifth aspect, the upper side gas supply opening and the lower side gas supply opening are respectively provided to the upper portion side and the lower portion side of the boundary between the main chamber on the front side and the delay chamber. Accordingly, for example, even were one out of the upper side gas supply opening or the lower side gas supply opening to be blocked by ingress of the B pillar to the vehicle cabin inside, or by interference with a seatbelt worn by the front seat occupant, gas supply to the delay chamber can still be secured through the other gas supply opening. This thereby enables increased robustness.

DESCRIPTION OF EMBODIMENTS

First Exemplary Embodiment

Explanation follows regarding a vehicle curtain airbag device 10 according to a first exemplary embodiment of the present invention, with reference to FIG. 1 to FIG. 8. Note that in each of the drawings, the arrow FR, the arrow UP, and the arrow OUT respectively indicate the front direction (direction of travel), the upward direction, and the vehicle width direction outside of a car (vehicle) 12 applied with the vehicle curtain airbag device 10, as appropriate. Hereafter, unless specifically indicated, reference simply to the front-rear, left-right, and up-down directions refers to the front and rear in the vehicle front-rear direction, left and right in the vehicle left-right direction (vehicle width direction), and up and down in the vehicle up-down direction.

Overall Configuration of the Curtain Airbag Device

Figure 1:
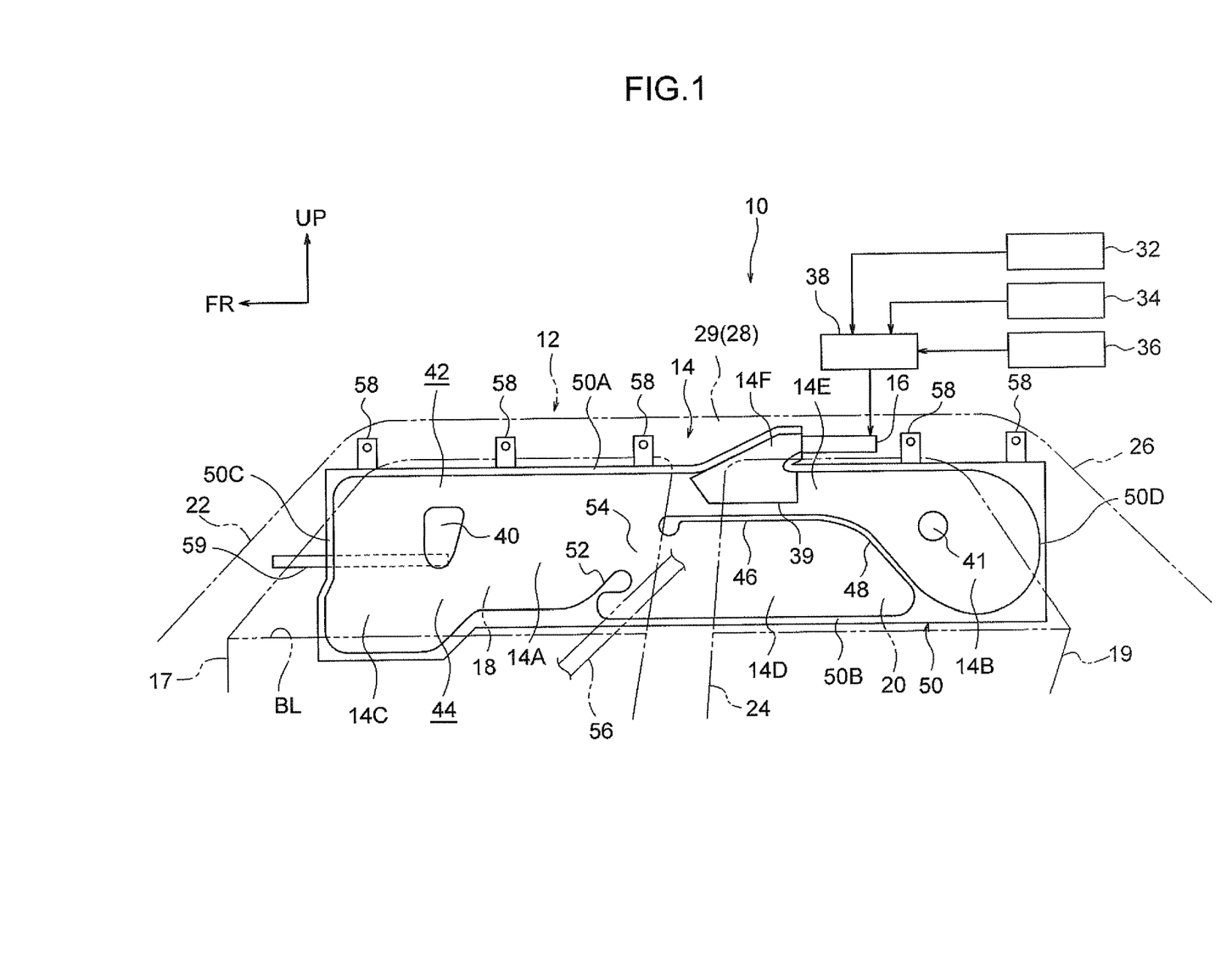
FIG. 1 is a side view of a schematic overall configuration of a vehicle curtain airbag device according to a first exemplary embodiment of the present invention as viewed from the vehicle width direction outside, illustrating an inflated and deployed state of a curtain airbag.

As illustrated in FIG. 1, the vehicle curtain airbag device 10 is installed in a sedan type car 12, for example, and includes curtain airbags 14 and inflators 16. Each curtain airbag 14 is formed so as to deploy in a curtain shape running along front and rear side window glass 18, 20, and a B pillar (center pillar) 24, provided to a side section of the vehicle cabin. The front side window 18 is provided to a front side door 17 positioned at the side of a front seat, and the rear side window 20 is provided to a rear side door 19 positioned at the side of a rear seat. The side window glass 18, 20 is covered by the curtain airbag 14.

The curtain airbag 14 is folded up into an elongated shape by a specific folding method including at least one out of rolling or pleat folding, and housed (disposed) together with the inflator 16 in a roof side section 28 provided at an upper end portion of the side section of the vehicle cabin. In this housed state, the curtain airbag 14 configured in an elongated shape extends across the roof side section 28, from an A pillar (front pillar) 22 to the vicinity of a C pillar (rear pillar) 26. The roof side section 28 includes a roof side rail 29 and a roof headliner, and the curtain airbag 14 and the inflator 16 are housed between the roof side rail 29 and the roof headliner.

Each inflator 16 is a gas generation device for supplying gas into the curtain airbag 14, and employs, for example, a combustion type or cold gas type inflator. A gas ejection section of the inflator 16 is in communication with the inside of the curtain airbag 14 through a connecting flow path 14F, described later. On actuation of the inflator 16, gas ejected from the gas ejection section is supplied into the curtain airbag 14.

The curtain airbags 14 and the inflators 16 described above are provided on both vehicle width direction sides of the car 12. Namely, the vehicle curtain airbag device 10 is provided with a pair of left and right curtain airbags 14 and a pair of left and right inflators 16. As illustrated in FIG. 1, the vehicle curtain airbag device 10 further includes an airbag ECU 38, electrically connected to a side collision sensor 32, a rollover sensor 34, and an oblique collision sensor 36, respectively.

The side collision sensor 32 is configured to predict or detect (the inevitability of) a side collision to the car 12, and output a side collision detection signal to the airbag ECU 38. The rollover sensor 34 is configured to predict or detect (the inevitability of) a rollover of the car 12, and output a rollover detection signal to the airbag ECU 38. The oblique collision sensor 36 is configured to predict or detect (the inevitability of) an oblique collision to the car 12, and output an oblique collision detection signal to the airbag ECU 38.

The airbag ECU 38 is electrically connected to the left and right inflators 16 respectively (only connection to one of the inflators 16 is illustrated in FIG. 1). When input with a side collision detection signal or an oblique collision detection signal, the airbag ECU 38 actuates the inflator 16 on the side of the side collision or side of the oblique collision (the nearer side in either case). Accordingly, in the event of a side collision or an oblique collision to the car 12, the curtain airbag 14 on the nearer side receives a gas supply, and inflates and deploys. When input with a rollover detection signal, the airbag ECU 38 actuates the inflators 16 on both sides in the vehicle width direction. When input with a rollover detection signal following a side collision or an oblique collision, the airbag ECU 38 actuates the inflator 16 on the opposite side (far side) to the nearer side that has already been actuated.

Curtain Airbag Configuration

Detailed explanation follows regarding configuration of the curtain airbag 14. Note that unless specifically indicated, explanation refers to the configuration (shape) in an inflated and deployed state of the curtain airbag 14.

The curtain airbag 14 is, for example, formed by integral bag weaving using a one piece woven method, shortened to OPW. In an OPW method, a stitchless bag is formed by weaving two pieces of fabric on a Jacquard loom at the same time, with multiple ply weaving performed at necessary locations. The method for manufacturing the curtain airbag 14 is not limited to the above. For example, the curtain airbag 14 may be manufactured by stitching a bag shape from one or more base cloths, formed by cutting out nylon-based or polyester-based fabric.

The curtain airbag 14 includes front and rear main chambers 14A, 14B, a front side oblique collision chamber 14C provided at the vehicle front of the front side main chamber 14A, and a RO chamber 14D, serving as a delay chamber, provided spanning between the front and rear main chambers 14A, 14B. The curtain airbag 14 also includes a gas supply path 14E placing the front and rear main chambers 14A, 14B in communication with each other, and the connecting flow path 14F connected to the inflator 16.

The main chamber 14A on the front side (referred to below as the front side main chamber 14A) inflates and deploys at the vehicle width direction outside of the head of an occupant in the front seat, and is interposed between the head of the front seat occupant and a side section of the vehicle body. As viewed from the side of the vehicle, the front side main chamber 14A is formed so as to cover a range spanning from a portion slightly to the vehicle front side of the front-rear direction center of the side window glass 18 to a rear end portion of the side window glass 18, from the inside of the vehicle cabin (the vehicle width direction inside). The front side main chamber 14A is set as a side collision head protection area that protects the head of the front seat occupant in a side collision. The side collision head protection area is set in a region capable of restraining the head of a side collision crash test dummy seated in the front seat in IIHS SUV side collision testing.

The main chamber 14B on the rear side (referred to below as the rear side main chamber 14B) inflates and deploys at the vehicle width direction outside of the head of an occupant seated in the rear seat, and is interposed between the head of the rear seat occupant and the vehicle body side section. As viewed from the side of the vehicle, the rear side main chamber 14B is formed so as to cover a range spanning from the front-rear direction center of the rear side window glass 20 to a front end portion of the C pillar 26, from the inside of the vehicle cabin (the vehicle width direction inside). As viewed from the side of the vehicle, an upper portion side of a rear end portion of the rear side main chamber 14B is formed so as to overlap with the C pillar 26. An island shaped non-inflating portion 41 is provided in the vicinity of a central portion of the rear side main chamber 14B. The rear side main chamber 14B is provided as a side collision head protection area that protects the head of the rear seat occupant in a side collision. It is set in a region capable of restraining the head of a side collision crash test dummy seated in the rear seat in IIHS SUV side collision testing.

The gas supply path 14E is provided to an upper end portion of the curtain airbag 14, slightly toward the vehicle rear of a front-rear direction intermediate portion thereof, and extending in the front-rear direction of the curtain airbag 14. The gas supply path 14E places an upper portion of the front side main chamber 14A and an upper portion of the rear side main chamber 14B in communication with each other. The tube shaped connecting flow path 14F extends out toward the upper side and the rear side from an upper end portion of the gas supply path 14E. A leading end portion (rear end portion) of the connecting flow path 14F is connected to the gas ejection section of the inflator 16. The inflator 16 is disposed between the front side main chamber 14A, this being a front section of the curtain airbag 14, and the rear side main chamber 14B, this being a rear section of the curtain airbag 14, and is fixed to the roof side rail 29 through a bracket.

A diffuser 39 (a flow regulating cloth, also referred to as an inner tube) is provided at the inside of the connecting flow path 14F and the gas supply path 14E. The diffuser 39 is provided inside the connecting flow path 14F and the gas supply path 14E, and distributes gas ejected from the inflator 16 toward the vehicle front and the vehicle rear.

The front side oblique collision chamber 14C inflates and deploys to the front of the front side main chamber 14A, and configures a front end portion of the curtain airbag 14 that protects the head of the front seat occupant from the front side of the front seat in an oblique collision or a rollover. As viewed from the side of the vehicle, an upper portion side of a front end portion of the front side oblique collision chamber 14C overlaps with the A pillar 22, and a lower end portion of the front side oblique collision chamber 14C is formed projecting further to the lower side than the front side main chamber 14A, so as to straddle above and below a door belt line BL of the front side door 17.

The front side oblique collision chamber 14C is partially separated (partitioned) from the front side main chamber 14A by an island shaped non-inflating portion 40. Respective restricted flow paths 42, 44 are provided above and below the non-inflating portion 40. The front side main chamber 14A and the front side oblique collision chamber 14C are in communication with each other through the restricted flow paths 42, 44.

The front side oblique collision chamber 14C is provided so as to cover the test point furthest to the front side out of test points (impactor impact points or strike points) that are contacted by an impactor corresponding to the head of a front seat occupant in rollover testing (FMVSS 226 standard). Other test points relating to the front seat occupant in this rollover testing are covered by the front side main chamber 14A.

The RO chamber 14D inflates and deploys between the front and rear main chambers 14A, 14B, and protects the head of the rear seat occupant from the front side of the rear seat in a rollover or an oblique collision. In the present exemplary embodiment, as viewed from the side of the vehicle, the RO chamber 14D is formed so as to cover a range spanning from a rear end portion of the side window glass 18 to a location slightly to the vehicle rear side of the front-rear direction center of the rear side window glass 20, from the inside of the vehicle cabin (vehicle width direction inside). A front portion of the RO chamber 14D is formed so as to overlap with the B pillar 24 and a rear end portion of the side window glass 18 as viewed from the side of the vehicle. The RO chamber 14D is provided spanning from a rear end portion of the front side main chamber 14A to a front end portion of the rear side main chamber 14B. More specifically, the RO chamber 14D is provided spanning across substantially the entire region between the side collision head protection area of the front side main chamber 14A to the side collision head protection area of the rear side main chamber 14B, described above.

The RO chamber 14D is positioned below a front portion of the gas supply path 14E, and is separated (partitioned) from the gas supply path 14E by a non-inflating portion (linear joint portion) 46 extending in the front-rear direction of the curtain airbag 14. A front end portion of the non-inflating portion 46 is provided at a position overlapping with a front end portion of the B pillar 24 as viewed from the side of the vehicle. An non-inflating portion (linear joint portion) 48 is integrated to, and extends from, a rear end portion of the non-inflating portion 46 toward a rear end side and lower end side of the curtain airbag 14. A lower end portion of the non-inflating portion 48 is integrated to, and extends from, a lower portion 50B of an outer peripheral non-inflating portion (linear joint portion) 50 set at an outer peripheral portion of the curtain airbag 14. The RO chamber 14D and the rear side main chamber 14B are separated (partitioned) from each other by the non-inflating portion 48.

In FIG. 1, the reference numeral 50A indicates an upper portion of the outer peripheral non-inflating portion 50, the reference numeral 50C indicates a front portion of the outer peripheral non-inflating portion 50, and the reference numeral 50D indicates a rear portion of the outer peripheral non-inflating portion 50. The upper portion 50A of the outer peripheral non-inflating portion 50 is interrupted by the rear end portion of the connecting flow path 14F, and the gas ejection section of the inflator 16 is attached at this interrupted portion.

The RO chamber 14D is partially separated (partitioned) from the front side main chamber 14A by a non-inflating portion 52 extending from the lower portion 50B of the outer peripheral non-inflating portion 50 toward the upper side. The non-inflating portion 52 is positioned slightly to the vehicle front side of the front end portion of the non-inflating portion 46, and is inclined toward the vehicle rear side on progression toward the upper side. A gas supply opening (restricted flow path) 54 to the RO chamber 14D is provided between an upper end portion of the non-inflating portion 52 and the front end portion of the non-inflating portion 46.

The gas supply opening 54 is provided at an upper portion side of a boundary between the front side main chamber 14A and the RO chamber 14D. The gas supply opening 54 places the rear end portion of the front side main chamber 14A and a front end portion of the RO chamber 14D in communication with each other. In the present exemplary embodiment, the RO chamber 14D is only provided with a single gas supply opening 54. As viewed from the side of the vehicle, the entire gas supply opening 54 is positioned further to the vehicle front side than the B pillar 24, and is formed (set) overlapping with a rear end portion of the side window glass 18. Namely, as viewed from the side of the vehicle, the gas supply opening 54 is set so as not to overlap with the B pillar 24. The gas supply opening 54 is formed at an upper portion side of the boundary between the front side main chamber 14A and the RO chamber 14D, and is set at a position further to the upper side than a seatbelt (shoulder belt) 56 worn by the front seat occupant. Note that in the present exemplary embodiment, as viewed from the side of the vehicle, the entire gas supply opening 54 is formed at a position further to the vehicle front side than the B pillar 24; however there is no limitation thereto, and it is sufficient that at least a portion of the gas supply opening 54 is formed at a position further to the vehicle front side than the B pillar 24 as viewed from the side of the vehicle.

The RO chamber 14D is provided so as to cover vehicle front-rear direction intermediate portion test points out of the test points (impactor impact points or strike points) contacted by an impactor corresponding to the head of a rear seat occupant in the rollover testing (FMVSS 226 standard) described above. In this rollover testing, test points at the front side and the rear side of the rear seat occupant are covered by the RO chamber 14D and the rear side main chamber 14B.

The upper portion 50A of the outer peripheral non-inflating portion 50, this being an upper edge of the curtain airbag 14, is provided with plural tabs 58 in a row along the vehicle front-rear direction. The curtain airbag 14 is fixed to a vehicle body frame (the A pillar 22, the roof side rail 29, and the C pillar 26) by fixing implements such as clips, or nuts and bolts, which pass through the tabs 58. The front end portion of the curtain airbag 14 is supported by a lower portion of the A pillar 22 through a tension belt 59 spanning between the non-inflating portion 40 and the A pillar 22.

During normal operation, the curtain airbag 14 is folded up from the lower end side to the upper end side and housed in the roof side section 28.

In the curtain airbag 14 configured as described above, on actuation of the inflator 16, gas from the inflator 16 is distributed to the front end side and the rear end side of the gas supply path 14E by the diffuser 39. The gas distributed by the diffuser 39 is supplied to the front and rear main chambers 14A, 14B through the front end portion and the rear end portion of the gas supply path 14E, and the front and rear main chambers 14A, 14B inflate. The curtain airbag 14 accordingly deploys toward the lower side along a side face of the vehicle cabin, while pushing a terminal portion of the roof headliner down toward the lower side.

A portion of the gas supplied to the front side main chamber 14A is supplied to the front side oblique collision chamber 14C through the restricted flow paths 42, 44, and the front side oblique collision chamber 14C inflates at a later timing than the front and rear main chambers 14A, 14B. A portion of the gas supplied to the front side main chamber 14A is also supplied to the RO chamber 14D through the gas supply opening 54, and the RO chamber 14D inflates later than the front and rear main chambers 14A, 14B.

Operation and Advantageous Effects

Next, explanation follows regarding operation and advantageous effects of the present exemplary embodiment.

Figure 2:
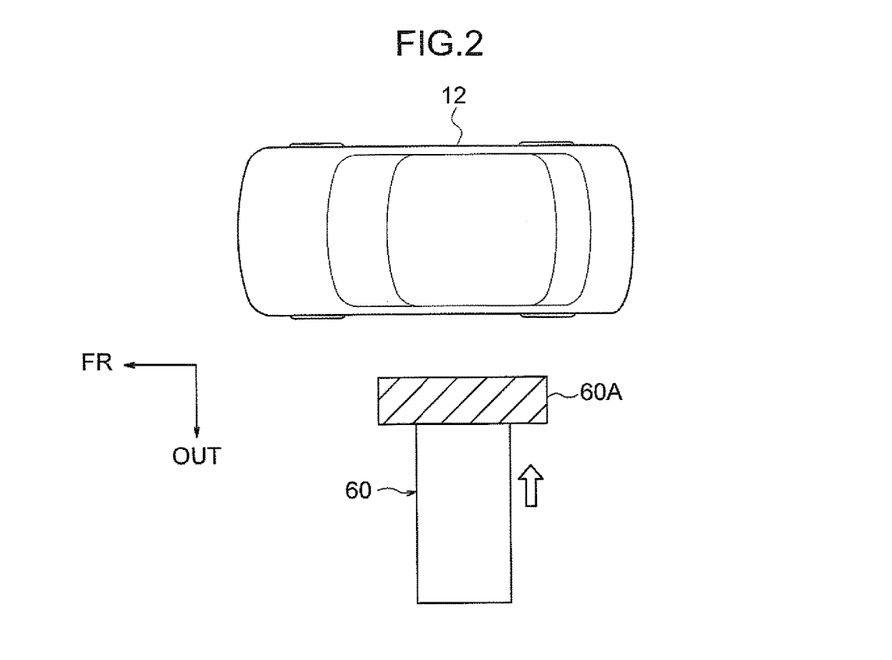
FIG. 2 is a plan view illustrating a car according to the first exemplary embodiment and an MDB.

FIG. 2 is a plan view illustrating the car 12 according to the present exemplary embodiment and a side impact crash test dolly 60 (Moving Deformable Barrier, referred to below as the MDB dolly 60). The MDB dolly 60 simulates a tall vehicle such as an SUV or a minivan, and has a barrier face 60A overlapping in the height direction with the head H of a front seat occupant FP (see FIG. 3). Operation and advantageous effects of the present exemplary embodiment are explained with reference to a side impact crash test (IIHS MDB) in which the MDB dolly 60 is made to collide with the side of the car 12. The collision speed of the MDB dolly 60 in this side impact crash testing is set at 60 km/h.

When the side collision sensor 32 predicts or detects the collision of the MDB dolly 60 to the side of the car 12, a side collision detection signal is output from the side collision sensor 32 to the airbag ECU 38. On receipt of the side collision detection signal, the airbag ECU 38 actuates the inflator 16 on the side of the side collision. On actuation of the inflator 16, gas from the inflator 16 is supplied to the front and rear main chambers 14A, 14B through the front end portion and the rear end portion of the gas supply path 14E, and the front and rear main chambers 14A, 14B inflate. The curtain airbag 14 accordingly deploys toward the lower side along the side face of the vehicle cabin (see FIG. 1 and FIG. 3).

Figure 3:
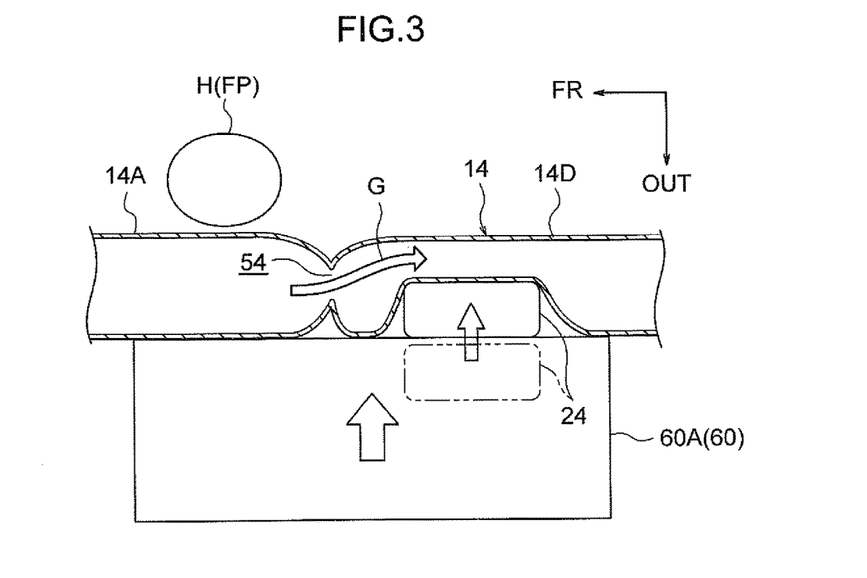
FIG. 3 is a plan view cross-section illustrating configuration peripheral to a B pillar of a car according to the first exemplary embodiment, to explain a scenario in which an MDB collides with the side of the car at 60 km/h.

Since the front and rear main chambers 14A, 14B inflate and deploy to the vehicle width direction outside of the head H of the front seat occupant FP and the head of a rear seat occupant, the front and rear main chambers restrain the respective heads of the front and rear seat occupants attempting to undergo displacement toward the vehicle width direction outside due to the impact of the side collision. Note that when the MDB dolly 60 has a high collision speed (60 km/h in this case), there are particular demands to suppress an excessive rise in internal pressure in the front side main chamber 14A that restrains the head H of the front seat occupant FP, and to suppress an increase in the load applied to the head H of the front seat occupant FP.

Regarding this point, in the present exemplary embodiment, the RO chamber 14D (delay chamber), to which gas is only supplied through the gas supply opening 54 formed to the boundary with the front side main chamber 14A, is provided spanning between the front and rear main chambers 14A, 14B. The RO chamber 14D is provided over a broad range spanning between the front and rear main chambers 14A, 14B, and is set with a large capacity. Gas is, moreover, only supplied to the large capacity RO chamber 14D through the front side main chamber 14A. Accordingly, some of the gas supplied to the front side main chamber 14A can escape efficiently to the RO chamber 14D when the front side main chamber 14A is pressed by the head H of the front seat occupant FP when the MDB dolly 60 collides at high speed. An excessive rise in the internal pressure of the front side main chamber 14A can accordingly be suppressed as a result, thereby enabling an increase in the load applied to the head H of the front seat occupant FP to be suppressed. Due to the above, a contribution is made to improving the head protection performance of the front seat occupant FP in a side collision.

Moreover, in the present exemplary embodiment, as viewed along the vehicle width direction in the inflated and deployed state of the front and rear main chambers 14A, 14B, the gas supply opening 54 is formed so as to be positioned further to the vehicle front side than the B pillar 24. This thereby enables squeezing and blockage of the gas supply opening 54 by the B pillar 24, and large reduction of the gas supply opening 54, to be avoided even when there is heavy ingress of the B pillar 24 to the inside of the vehicle cabin (the vehicle width direction inside) in a side collision of the MDB dolly 60 to the car 12 at 60 km/h (see FIG. 5). A necessary surface area is accordingly secured for the gas supply opening 54, and choking of the gas supply opening 54 by the B pillar 24 is prevented. This thereby enables gas to escape from the front side main chamber 14A to the RO chamber 14D in a stable manner (see arrow G in FIG. 5).

Figure 4:
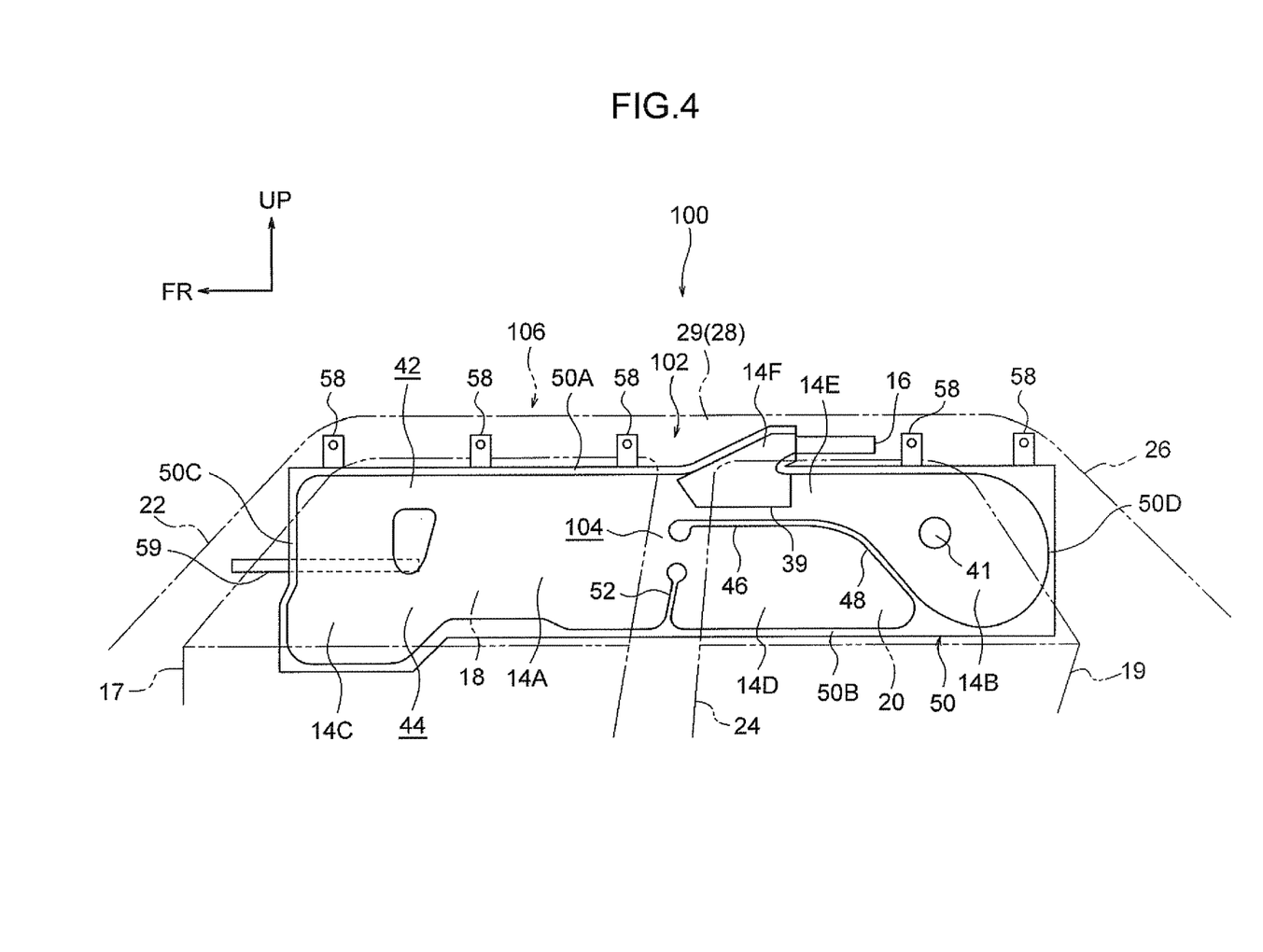
FIG. 4 is a side view corresponding to FIG. 1, illustrating configuration of relevant portions of a vehicle curtain airbag device according to a comparative example.
Figure 5:
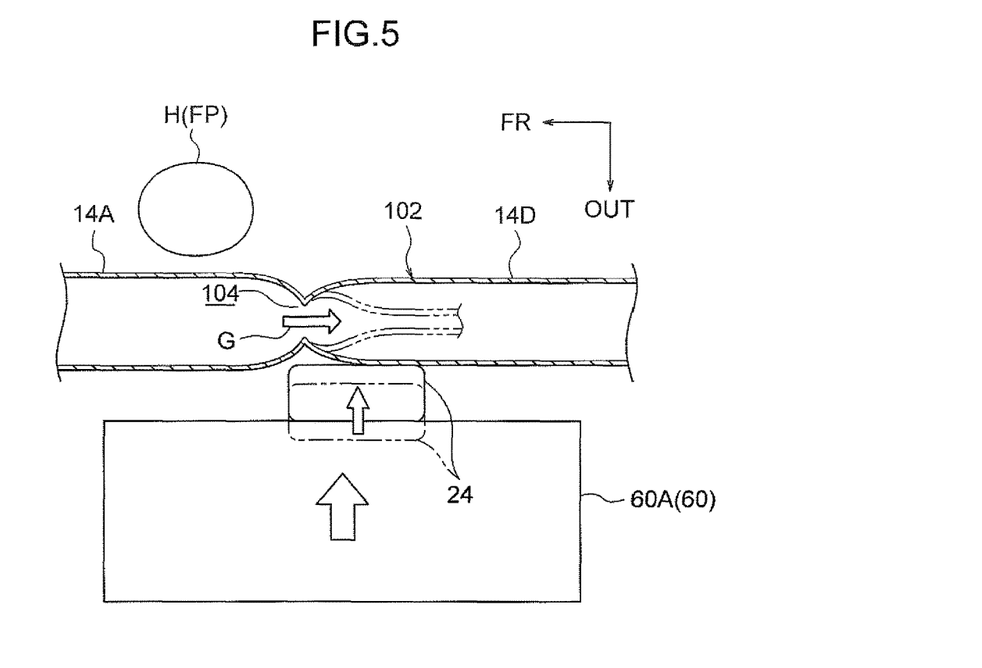
FIG. 5 is a drawing corresponding to FIG. 3, to explain a scenario in which an MDB collides with the side of a car according to the comparative example at 50 km/h.
Figure 6:
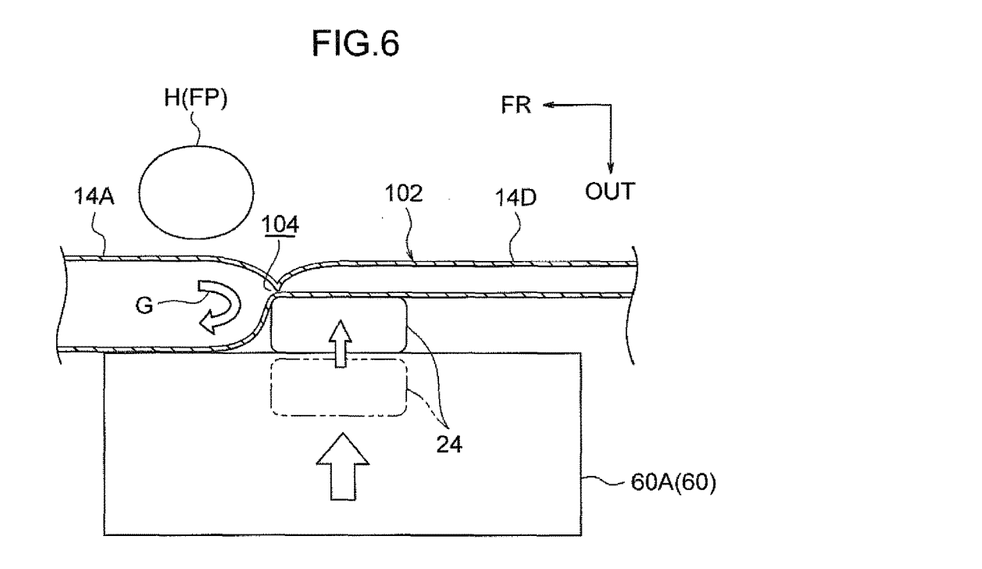
FIG. 6 is a drawing corresponding to FIG. 3, to explain a scenario in which an MDB collides with the side of a car according to the comparative example at 60 km/h.

Explanation follows regarding the above advantageous effect, with reference to a comparative example illustrated in FIG. 4 to FIG. 6. As illustrated in FIG. 4, in a curtain airbag 102 of a vehicle curtain airbag device 100 according to the comparative example, a gas supply opening 104 overlaps with the B pillar 24 as viewed along the vehicle width direction in an inflated and deployed state of the curtain airbag 102. In the comparative example, the cross-section area of the gas supply opening 104 is set smaller than the cross-section area of the gas supply opening 54 according to the present exemplary embodiment. The comparative example is otherwise of similar configuration to the present exemplary embodiment, and in FIG. 4 to FIG. 6, configuration similar to that of the present exemplary embodiment is allocated the same reference numerals thereto.

As illustrated in FIG. 5, when the MDB dolly 60 is made to collide with the side of a car 106 according to the comparative example at 50 km/h, the ingress amount of the B pillar 24 to the vehicle cabin inside is small, and so the required cross-section area of the gas supply opening 104 is secured. This thereby permits the supply of gas from the front side main chamber 14A to the RO chamber 14D, suppressing a rise in internal pressure of the front side main chamber 14A.

However, as illustrated in FIG. 6, when the MDB dolly 60 is made to collide with the side of the car 106 according to the comparative example at 60 km/h, there is a larger ingress amount of the B pillar 24 to the vehicle cabin inside, and the gas supply opening 104 is squeezed and squashed by the B pillar 24. The gas supply from the front side main chamber 14A to the RO chamber 14D is thereby impeded (see arrow G in FIG. 6), and the internal pressure of the front side main chamber 14A rises. The load applied from the front side main chamber 14A to the head H of the front seat occupant FP accordingly increases, raising the head injury criterion (HIC).

Regarding this point, as described above, the present exemplary embodiment enables gas to escape from the front side main chamber 14A to the RO chamber 14D in a stable manner, and enables an excessive rise in the internal pressure of the front side main chamber 14A to be effectively suppressed, thereby enabling an increase in the HIC to be avoided.

Figure 7:
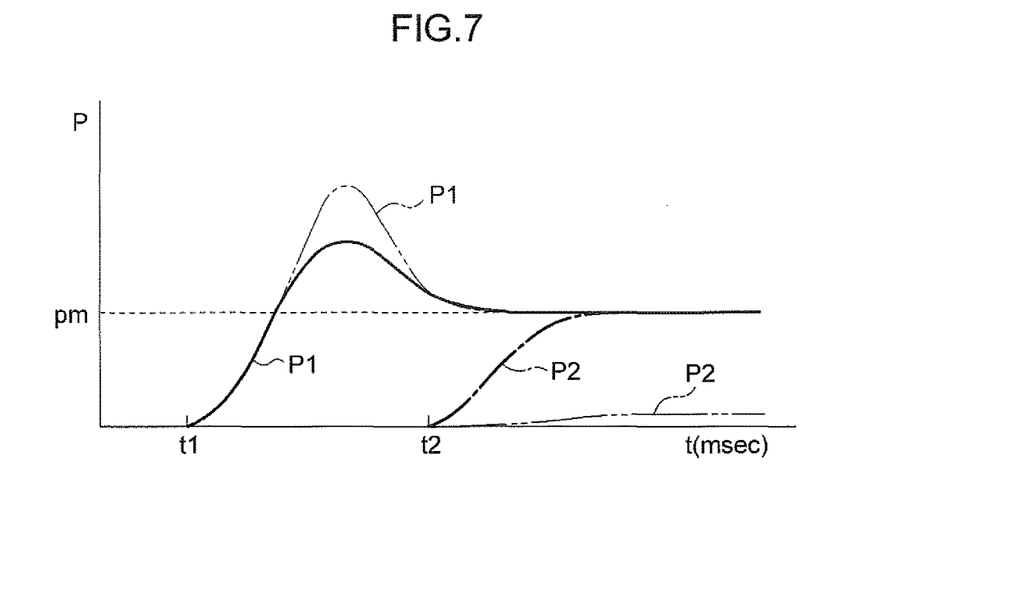
FIG. 7 is a line graph to explain a relationship between the internal pressure of front and rear main chambers of the curtain airbag according to the comparative example, and time following a side collision.
Figure 8:
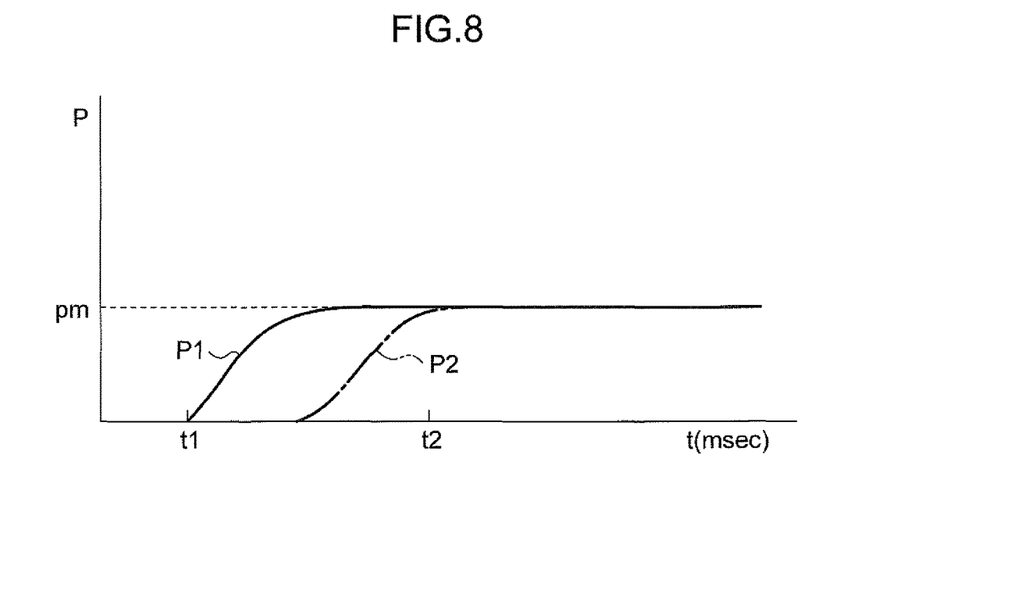
FIG. 8 is a line graph to explain a relationship between the internal pressure of front and rear main chambers of a curtain airbag according to the first exemplary embodiment, and time following a side collision.

FIG. 7 is a line graph illustrating a relationship between internal pressure P1 of the front side main chamber 14A and internal pressure P2 of the RO chamber 14D of the curtain airbag 102 according to the comparative example, and time t following a side collision. FIG. 8 is a line graph illustrating a relationship between internal pressure P1 of the front side main chamber 14A and internal pressure P2 of the RO chamber 14D of the curtain airbag 14 according to the present exemplary embodiment, and time t following a side collision.

As illustrated in FIG. 7, in the comparative example, the internal pressure P1 of the front side main chamber 14A begins to rise at a time t1, for example 25 msec after the side collision, and the internal pressure P2 of the RO chamber 14D begins to rise at a time t2, for example 40 msec after the side collision. The cross-section area of the gas supply opening 104 according to the comparative example is set smaller than the cross-section area of the gas supply opening 54 according to the present exemplary embodiment, and so gas supply from the front side main chamber 14A to the RO chamber 14D is delayed when the front side main chamber 14A is pressed by the head H of the front seat occupant FP, such that the internal pressure P1 of the front side main chamber 14A rises above an appropriate value pm. Moreover, in the comparative example, if the gas supply opening 104 is squashed by ingress of the B pillar 24 to the vehicle cabin inside due to a large ingress amount of the B pillar 24 to the vehicle cabin inside, the internal pressure P2 of the RO chamber 14D hardly rises at all, while there is an excessive rise in the internal pressure P1 of the front side main chamber 14A, as illustrated by the double-dotted intermittent lines in FIG. 7.

However, in the present exemplary embodiment, the cross-section area of the gas supply opening 54 is set larger than the cross-section area of the gas supply opening 104 according to the comparative example, and so, as illustrated in FIG. 8, the internal pressure of the RO chamber 14D begins to rise earlier than in the comparative example. Accordingly, the internal pressure P1 of the front side main chamber 14A does not rise excessively. Moreover, in the present exemplary embodiment, as described above, squeezing and blockage of the gas supply opening 54 by the B pillar 24, or large reduction of the gas supply opening 54, can be avoided even when there is heavy ingress of the B pillar 24 to the inside of the vehicle cabin. This thereby enables an excessive increase in the internal pressure P1 of the front side main chamber 14A (see the P1 illustrated by the double-dotted intermittent line in FIG. 7) to be avoided.

In the present exemplary embodiment, a single gas supply opening 54 is formed to the boundary between the front side main chamber 14A and the RO chamber 14D, enabling the cross-section area of the gas supply opening 54 to be set larger than when plural gas supply openings are formed along the boundary. Moreover, as viewed along the vehicle width direction in the inflated and deployed state of the front and rear main chambers 14A, 14B, the entirety of the single gas supply opening 54 is positioned to the vehicle front side of the B pillar 24, such that the advantageous effect of enabling stable gas escape from the front side main chamber 14A to the RO chamber 14D can be well-secured.

In the present exemplary embodiment, the gas supply opening 54 of the RO chamber 14D is provided at the upper portion side of the boundary between the front side main chamber 14A and the RO chamber 14D, rather than at the lower portion side, where there would be a possibility of interference with the seatbelt (shoulder belt) 56 worn by the front seat occupant FP. This accordingly contributes to preventing or suppressing blockage of the gas supply opening 54 due to interference with the seatbelt (shoulder belt) 56.

Note that in the first exemplary embodiment, the gas supply opening 54 is formed at a position further to the vehicle front side than the B pillar 24 as viewed from the side of the vehicle. However, there is no limitation thereto, and the entire gas supply opening 54 may be configured overlapping with the B pillar 24 as viewed from the side of the vehicle. Such a configuration still enables similar operation and advantageous effects to be obtained to in the first exemplary embodiment described above, with the exception of preventing choking of the gas supply opening 54 by the B pillar 24.

Next, explanation follows regarding other exemplary embodiments of the present invention. Configuration and advantageous effects that are basically the same as those of the first exemplary embodiment are allocated the same reference numerals as in the first exemplary embodiment, and explanation thereof is omitted.

Second Exemplary Embodiment

Figure 9:
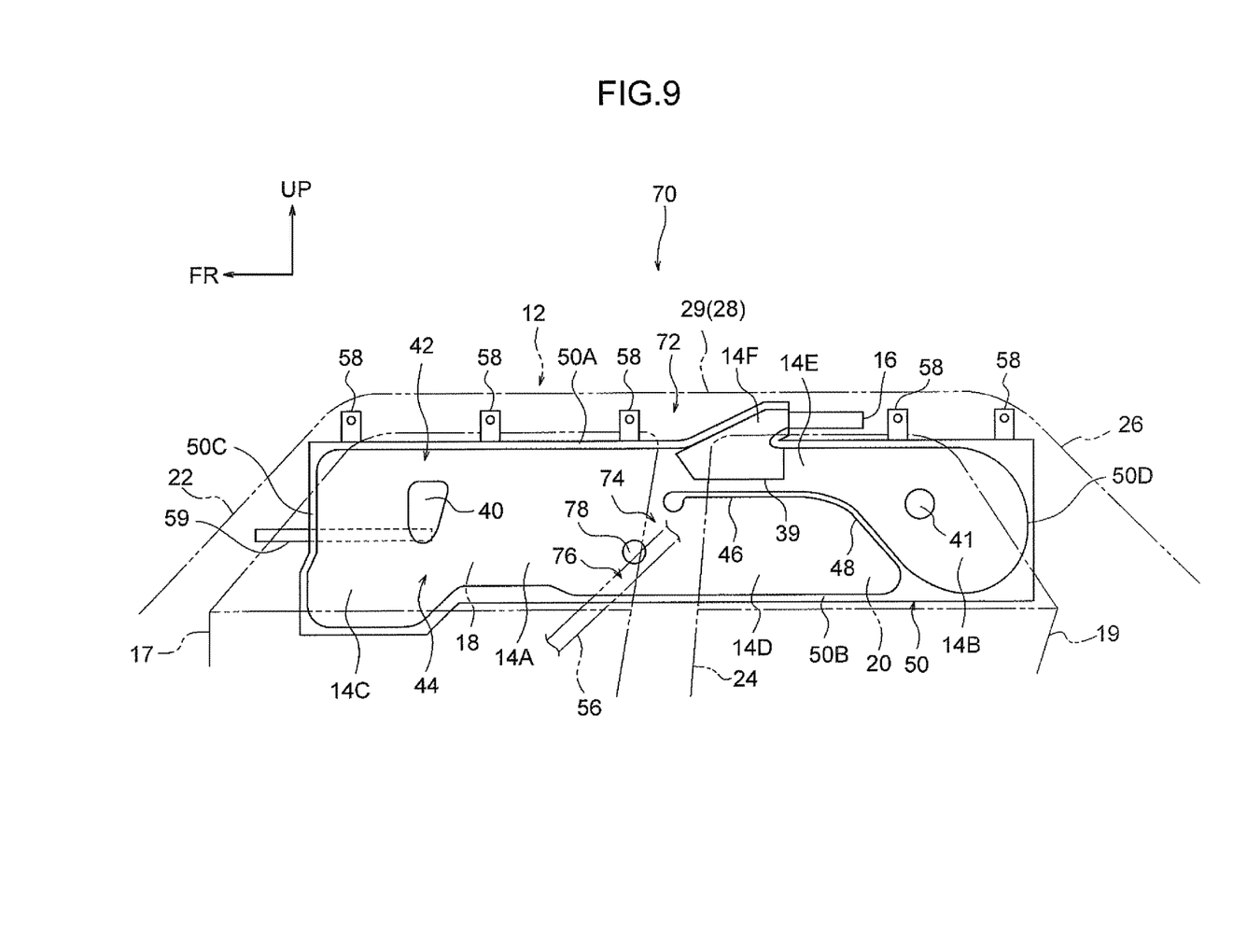
FIG. 9 is a side view of configuration of relevant portions of a vehicle curtain airbag device according to a second exemplary embodiment as viewed from the vehicle width direction outside, illustrating an inflated and deployed state of a curtain airbag.

FIG. 9 is a side view corresponding to FIG. 1, illustrating configuration of relevant portions of a vehicle curtain airbag device 70 according to a second exemplary embodiment of the present invention. Configuration of a curtain airbag 72 of the vehicle curtain airbag device 70 differs from that of the curtain airbag 14 according to the first exemplary embodiment. In place of the gas supply opening 54 according to the first exemplary embodiment, the curtain airbag 72 is provided with an upper side gas supply opening 74 and a lower side gas supply opening 76, serving as gas supply openings. An island shaped non-inflating portion 78 is provided between the upper side gas supply opening 74 and the lower side gas supply opening 76.

The upper side gas supply opening 74 is provided to an upper portion side of the boundary between the front side main chamber 14A and the RO chamber 14D, and the lower side gas supply opening 76 is provided to a lower portion side of the boundary between the front side main chamber 14A and the RO chamber 14D. As viewed along the vehicle width direction in an inflated and deployed state of the curtain airbag 72, the upper side gas supply opening 74 overlaps with the B pillar 24, and the lower side gas supply opening 76 is positioned further to the vehicle front side than the B pillar 24 (does not overlap with the B pillar 24). Other configuration is similar to that of the first exemplary embodiment.

In the present exemplary embodiment, in the event of a side collision, gas is only supplied to the RO chamber 14D through the upper side gas supply opening 74 and the lower side gas supply opening 76 that are in communication with the front side main chamber 14A. Some the gas supplied to the front side main chamber 14A can accordingly escape efficiently to the RO chamber 14D, thereby enabling similar operation and advantageous effects to be obtained to the first exemplary embodiment.

Figure 10:
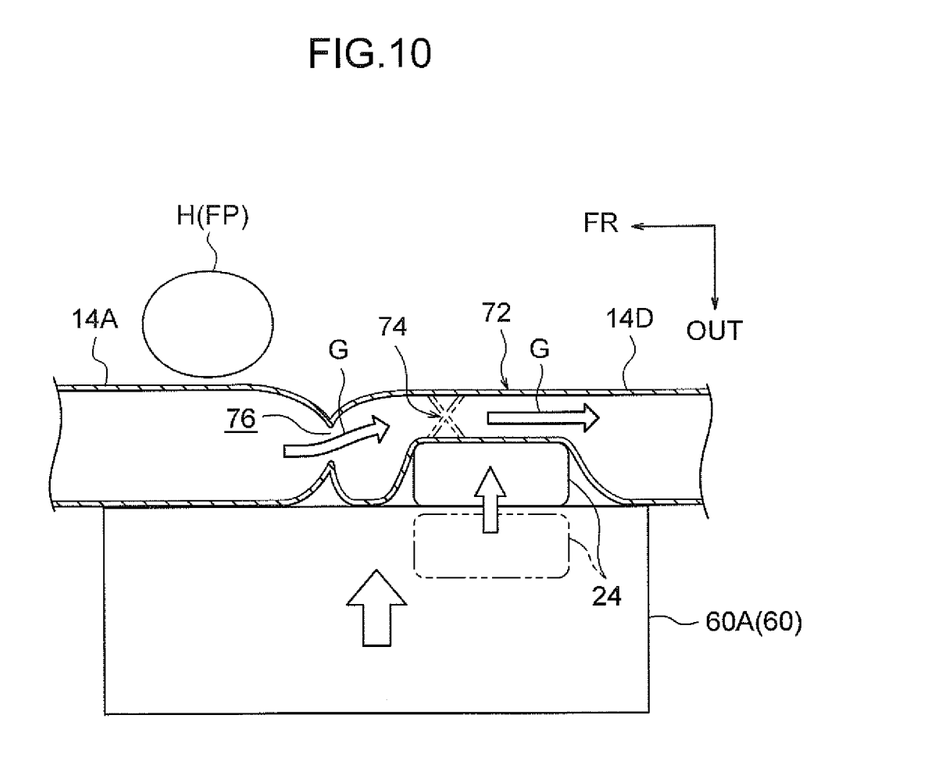
FIG. 10 is a plan view cross-section illustrating configuration peripheral to a B pillar of a car according to the second exemplary embodiment, to explain a scenario in which an MDB collides with the side of the car at 60 km/h.

Moreover, in the present exemplary embodiment, as illustrated in FIG. 10, for example, gas is able to escape from the front side main chamber 14A to the RO chamber 14D through the lower side gas supply opening 76, even if the upper side gas supply opening 74 has been squeezed and blocked by ingress of the B pillar 24 to the vehicle cabin inside (see arrow G in FIG. 10). Moreover, for example, gas is still able to escape from the front side main chamber 14A to the RO chamber 14D through the upper side gas supply opening 74, even if the lower side gas supply opening 76 has been blocked by interference with the seatbelt (shoulder belt) 56. This thereby enables increased robustness.

Third Exemplary Embodiment

Figure 11:
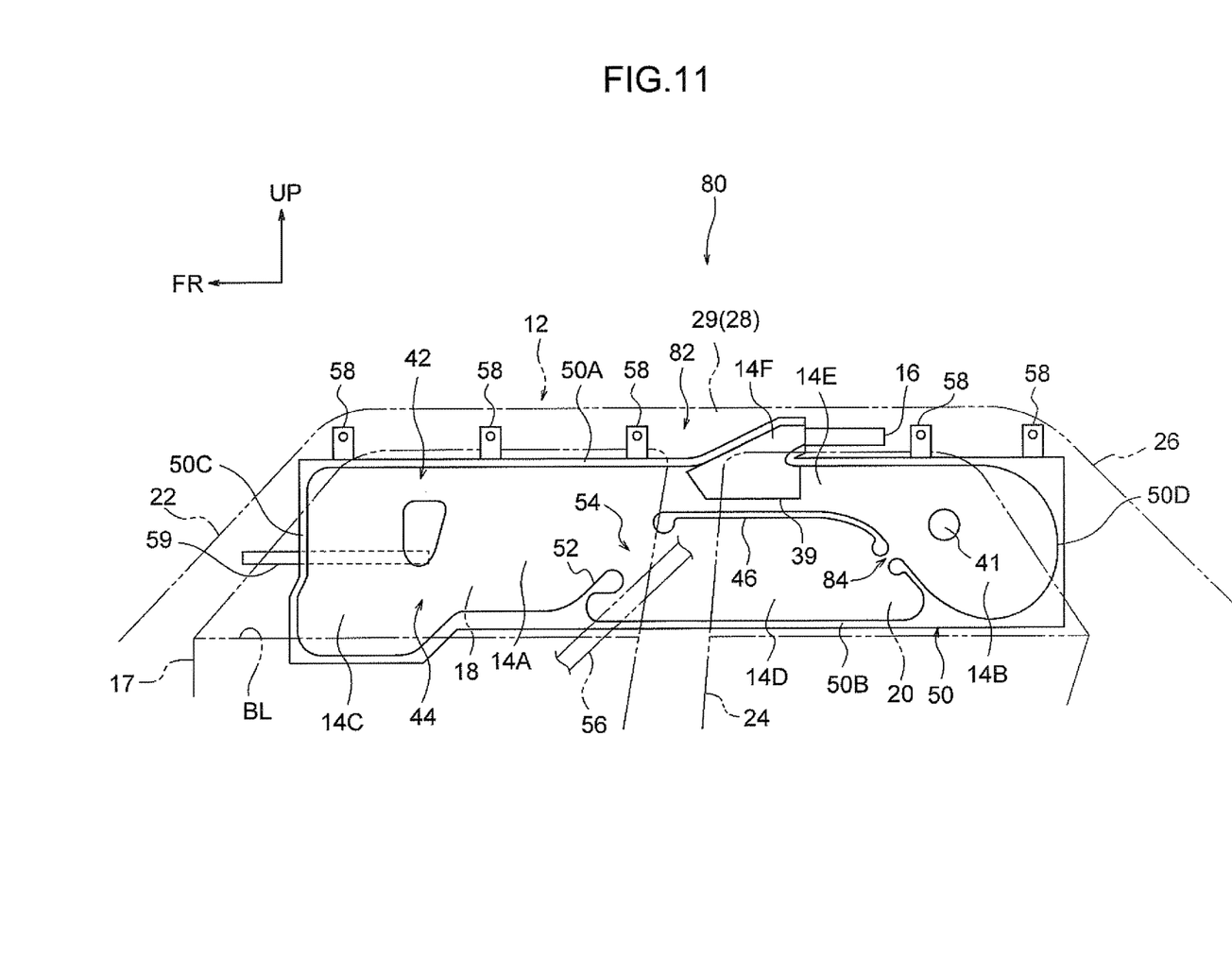
FIG. 11 is a side view of configuration of relevant portions of a vehicle curtain airbag device according to a third exemplary embodiment as viewed from the vehicle width direction outside, illustrating an inflated and deployed state of a curtain airbag.

FIG. 11 is a side view corresponding to FIG. 1, illustrating configuration of relevant portions of a vehicle curtain airbag device 80 according to a third exemplary embodiment of the present invention. Configuration of a curtain airbag 82 of the vehicle curtain airbag device 80 differs from the curtain airbag 14 according to the first exemplary embodiment. In the curtain airbag 82, the rear side main chamber 14B and the RO chamber 14D are placed in communication with each other by a rear side gas supply opening 84 formed to a boundary between the rear side main chamber 14B and the RO chamber 14D. The cross-section area of the rear side gas supply opening 84 is set sufficiently smaller than that of the gas supply opening 54. Otherwise, configuration is similar to that of the first exemplary embodiment.

In the present exemplary embodiment, a portion of the gas supplied to the rear side main chamber 14B is supplied to the RO chamber 14D through the rear side gas supply opening 84. Although the efficiency with which gas is supplied (gas escape efficiency) from the front side main chamber 14A to the RO chamber 14D through the gas supply opening 54 is reduced, in other respects similar operation and advantageous effects can be obtained to those of the first exemplary embodiment.

Explanation has been given regarding the present invention using various exemplary embodiments; however various modifications may be implemented within a range not departing from the spirit of the present invention. Moreover, the scope of rights encompassed by the present invention is not limited by the exemplary embodiments described above.

As described above, the vehicle curtain airbag device according to the present invention contributes to improved front seat occupant head protection performance in a side collision.

The invention claimed is:

1. A vehicle curtain airbag device comprising:
   front and rear main chambers that receive gas supplied from an inflator, and that inflate and deploy between respective positions of heads of a front seat occupant and a rear seat occupant, and a side section of a vehicle body; and
   a delay chamber that is provided spanning between the front and rear main chambers, and that is only supplied with gas through a gas supply opening formed at a boundary between the delay chamber and the main chamber on a front side, wherein:
   the delay chamber deploys closer to a vehicle rear than a B pillar of the vehicle by passing over the B pillar from a position closer to a vehicle front than the B pillar,
   the delay chamber protects the head of the rear seat occupant when rollovers or oblique collisions occur, and
   the gas supply opening for the delay chamber is formed at the boundary between the front main chamber and the delay chamber such that the entire gas supply opening slopes toward the vehicular front as the boundary goes downward.

2. The vehicle curtain airbag device of claim 1, wherein at least a portion of the gas supply opening is forward of the B pillar in an inflated and deployed state.

3. The vehicle curtain airbag device of claim 1, wherein the gas supply opening is formed at a higher position than a shoulder belt.

4. The vehicle curtain airbag device of claim 2, wherein a single gas supply opening is provided, and in the inflated and deployed state, the entire gas supply opening is forward of the B pillar.

5. A vehicle curtain airbag device comprising:
   front and rear main chambers that receive gas supplied from an inflator and that inflate and deploy between respective positions of heads of a front seat occupant and a rear seat occupant, and a side section of a vehicle body; and
   a delay chamber that is provided spanning between the front and rear main chambers, and that is supplied with gas through a gas supply opening formed at a boundary between the delay chamber and the main chamber on a front side, wherein:
   at least a portion of the gas supply opening is forward of a B pillar of the vehicle in an inflated and deployed state of the front and rear main chambers,
   the delay chamber deploys closer to a vehicle rear than the B pillar by passing over the B pillar from a position closer to the vehicle front than the B pillar,
   the delay chamber protects the head of the rear seat occupant when rollovers or oblique collisions occur, and
   the gas supply opening for the delay chamber is formed at the boundary between the front main chamber and the delay chamber such that the entire gas supply opening slopes toward the vehicular front as the boundary goes downward.

6. The vehicle curtain airbag device of claim 5, wherein a single gas supply opening is provided, and in the inflated and deployed state, the entire gas supply opening is positioned forward of the B pillar.

7. The vehicle curtain airbag device of claim 5, wherein:
   the gas supply opening is configured by an upper side gas supply opening provided at an upper portion side of the boundary, and a lower side gas supply opening provided at a lower portion side of the boundary; and
   as viewed along a vehicle width direction in the inflated and deployed state, the upper side gas supply opening overlaps with the B pillar, and the lower side gas supply opening is positioned forward of the B pillar.

8. The vehicle curtain airbag device of claim 7, wherein the gas supply opening is formed at a higher position than a shoulder belt.

9. The vehicle curtain airbag device of claim 5, wherein:
   a rear side gas supply opening is formed at a boundary between the main chamber on a rear side and the delay chamber in addition to the gas supply opening formed at the boundary with the main chamber on the front side; and a cross-sectional area of the rear side gas supply opening is smaller than a cross-sectional area of the gas supply opening formed at the boundary with the main chamber on the front side.

10. The vehicle curtain airbag device of claim 1, wherein the delay chamber covers a range spanning from a rear end portion of a front side window glass to a location at a vehicle rear side of a front-rear direction center of a rear side window glass from the inside of a vehicle cabin when viewed from a side of the vehicle.

11. The vehicle curtain airbag device of claim 1, wherein the gas supply opening is provided at an upper portion side of the boundary between the front main chamber and the delay chamber.

12. The vehicle curtain airbag device of claim 5, wherein the delay chamber covers a range spanning from a rear end portion of a front side window glass to a location at a vehicle rear side of a front-rear direction center of a rear side window glass from the inside of a vehicle cabin when viewed from a side of the vehicle.

13. The vehicle curtain airbag device of claim 5, wherein the gas supply opening is provided at an upper portion side of the boundary between the front main chamber and the delay chamber.

14. A vehicle curtain airbag device comprising:
front and rear main chambers that receive gas supplied from an inflator, and that inflate and deploy between respective positions of heads of a front seat occupant and a rear seat occupant, and a side section of a vehicle body; and
a delay chamber that is provided spanning between the front and rear main chambers, and that is only supplied with gas through a gas supply opening formed at a boundary between the delay chamber and the main chamber on a front side, wherein:
the delay chamber deploys closer to a vehicle rear than a B pillar of the vehicle by passing over the B pillar from a position closer to a vehicle front than the B pillar,
the delay chamber protects the head of the rear seat occupant when rollovers or oblique collisions occur, and
the gas supply opening is provided at an upper portion side of the boundary between the front main chamber and the delay chamber.

15. A vehicle curtain airbag device comprising:
front and rear main chambers that receive gas supplied from an inflator and that inflate and deploy between respective positions of heads of a front seat occupant and a rear seat occupant, and a side section of a vehicle body; and
a delay chamber that is provided spanning between the front and rear main chambers, and that is supplied with gas through a gas supply opening formed at a boundary between the delay chamber and the main chamber on a front side, wherein:
at least a portion of the gas supply opening is forward of a B pillar of the vehicle in an inflated and deployed state of the front and rear main chambers,
the delay chamber deploys closer to a vehicle rear than the B pillar by passing over the B pillar from a position closer to the vehicle front than the B pillar,
the delay chamber protects the head of the rear seat occupant when rollovers or oblique collisions occur, and
the gas supply opening is provided at an upper portion side of the boundary between the front main chamber and the delay chamber.

* * * * *